United States Patent
Quint

(10) Patent No.: US 11,060,881 B2
(45) Date of Patent: Jul. 13, 2021

(54) METHOD AND APPARATUS FOR NAVIGATION INSTRUCTIONS INCLUDING ENHANCED LANE GUIDANCE

(71) Applicant: FORD GLOBAL TECHNOLOGIES, LLC, Dearborn, MI (US)

(72) Inventor: Jason Meyer Quint, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 772 days.

(21) Appl. No.: 15/800,854

(22) Filed: Nov. 1, 2017

(65) Prior Publication Data

US 2019/0128696 A1 May 2, 2019

(51) Int. Cl.
*G01C 21/36* (2006.01)
*G01C 21/34* (2006.01)

(52) U.S. Cl.
CPC ..... *G01C 21/3658* (2013.01); *G01C 21/3461* (2013.01); *G01C 21/3492* (2013.01); *G01C 21/3632* (2013.01); *G01C 21/3667* (2013.01)

(58) Field of Classification Search
None
See application file for complete search history.

(56) References Cited

U.S. PATENT DOCUMENTS

| | | | |
|---|---|---|---|
| 6,700,505 B2 | 3/2004 | Yamashita et al. | |
| 7,899,617 B2 | 3/2011 | Kawakami et al. | |
| 9,568,327 B2 | 2/2017 | Park et al. | |
| 2004/0209594 A1* | 10/2004 | Naboulsi | B60Q 9/00 455/404.1 |
| 2013/0194109 A1* | 8/2013 | Clark | G01C 21/26 340/905 |
| 2014/0156182 A1* | 6/2014 | Nemec | B62D 1/28 701/430 |
| 2016/0304126 A1 | 10/2016 | Yamaoka et al. | |
| 2016/0341561 A1* | 11/2016 | Woolley | G01C 21/3658 |
| 2016/0364621 A1* | 12/2016 | Hill | G06T 7/70 |
| 2019/0003846 A1* | 1/2019 | Limber | G01C 21/3658 |
| 2020/0080862 A1* | 3/2020 | Pluciennik | G01C 21/3632 |

* cited by examiner

*Primary Examiner* — Navid Ziaeianmehdizadeh
(74) *Attorney, Agent, or Firm* — Michael Spenner; Brooks Kushman P.C.

(57) ABSTRACT

A system includes a processor configured to determine relative suitability of each lane on a current route for completing a maneuver on the route. The processor is also configured to display an ordered series of maneuver instructions, in conjunction with a route map, the instructions including arrows corresponding to each lane on a next-segment of the route and color coded in accordance with the determined suitability of each lane.

6 Claims, 6 Drawing Sheets

METHOD AND APPARATUS FOR NAVIGATION INSTRUCTIONS INCLUDING ENHANCED LANE GUIDANCE

TECHNICAL FIELD

The illustrative embodiments generally relate to methods and apparatuses for navigation instructions including enhanced lane guidance.

BACKGROUND

Many drivers use digital navigation assistance, which includes both vehicle-based navigation and phone or other device-based navigation. This detailed digital information often includes multiple directions, turning distances and sometimes even a visual approximation of what the driver would see ahead. Even with the assistance, however, many navigation challenges still exist when drivers are maneuvering through unfamiliar territory.

For example, navigation instructions often include a left or right turn, but fail to notify a user of what the next step is until the turn is completed. This can create difficulty if another maneuver is immediately required. Similarly, navigation instructions typically present series of distances and turns, but little other information about an upcoming route. While traffic and construction data may be included, characteristics of the road network itself are not frequently addressed by navigation.

As a result, while navigation has grown increasingly easier through digital assistance, drivers may still find the current navigation systems lacking in certain ways. Improvements to existing navigation systems can create a level of intuitive or instructed driving that would normally only be achieved through a known familiarity with a geographic region and the road networks thereof.

SUMMARY

In a first illustrative embodiment, a system includes a processor configured to determine relative suitability of each lane on a current route for completing a maneuver on the route. The processor is also configured to display an ordered series of maneuver instructions, in conjunction with a route map, the instructions including arrows corresponding to each lane on a next-segment of the route and color coded in accordance with the determined suitability of each lane.

In a second illustrative embodiment, a computer-implemented method includes determining suitability, of each lane on a present route portion and a plurality of next route-portions, following leaving a present road, for completing a next-maneuver following a given route-portion on a route. The method also includes color coding each lane in accordance with the determined suitability and displaying color-coded lanes for the present route portion and visual instructions, including arrows color-coded and corresponding to the color-coded lanes, for at least two next route-portions.

In a third illustrative embodiment, a computer-implemented method includes determining that a vehicle has reached a route-portion over which a plurality of driving maneuvers are required, each maneuver within a predefined distance of another of the maneuvers. The method further includes providing enhanced navigation responsive to the determining, including visual and audible alerts, distraction suppression and color-coded visual display of arrows corresponding to either at least three successive maneuvers or a minimum number of successive maneuvers remaining in the plurality of maneuvers.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
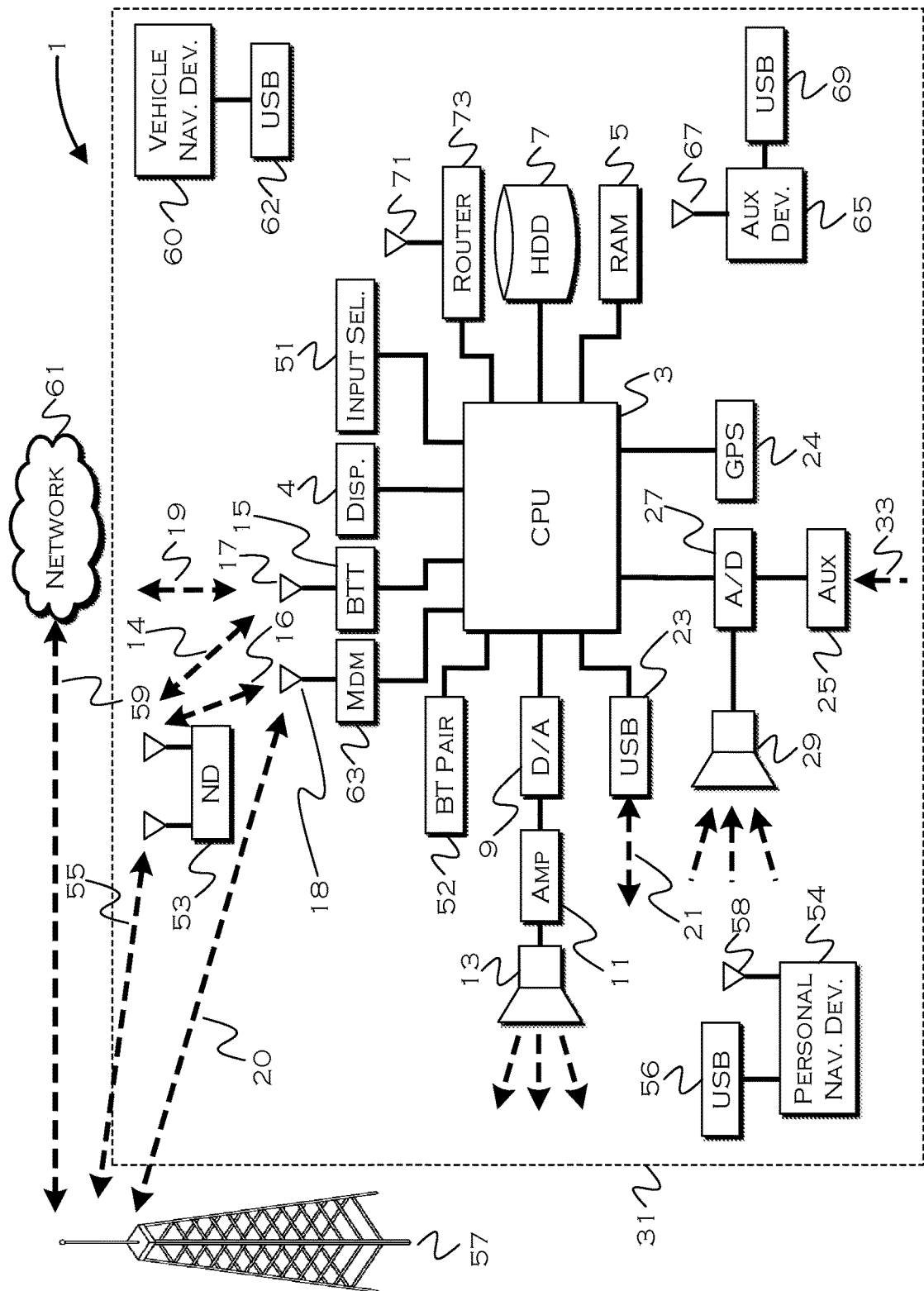
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Digital navigation assistance has brought a level of increased mobility and driving comfort to users across the globe. While digital directions are useful, however, they often fail to reflect localized road layout in a manner that can allow a visiting driver to drive as though the driver had frequently traveled in an area. For example, on Main Street traveling through downtown Ann Arbor Mich., Main Street crosses alternating one-way streets. As such, the center and rightmost lanes shift functions as alternating straight and turn lanes, such that if the driver were to continue in any one lane, they would, only one block later, be forced into a turn.

While most driving instructions will include directions to proceed straight ahead, for example, they will not include instructions to alternate lanes, relying on the driver to intuit this information from road signs and the behavior of other vehicles. This means that a driver unfamiliar with the layout will possibly quickly be forced into an undesirable turn, and this can lead to some frustration while driving, especially if the driver is forced to go a significant distance out of the way to re-achieve the desired route.

In a similar manner, drivers making a series of quick lefts and rights may need to shift lanes very quickly, and without advanced knowledge of which lane to travel in, the driver may miss a turn. This is a common scenario because the driver cannot even see the road following a turn in most situations, and so may have no way of knowing that a one or two lane shift is immediately required after using a particular lane to make a turn. These "pain points" may require an increased level of attention, especially when driving in an unfamiliar area, otherwise, a driver quickly find themselves in an undesirable situation, and navigation will have to accommodate.

The illustrative embodiments address many of these current navigation issues by providing advanced lane-oriented guidance, which can visually and audibly explain to a driver what actions are required in advance of encountering a difficult situation. This will allow the driver to focus more closely on the road ahead, and will hopefully help the driver feel a level of comfort in difficult navigational situations.

Figure 2:
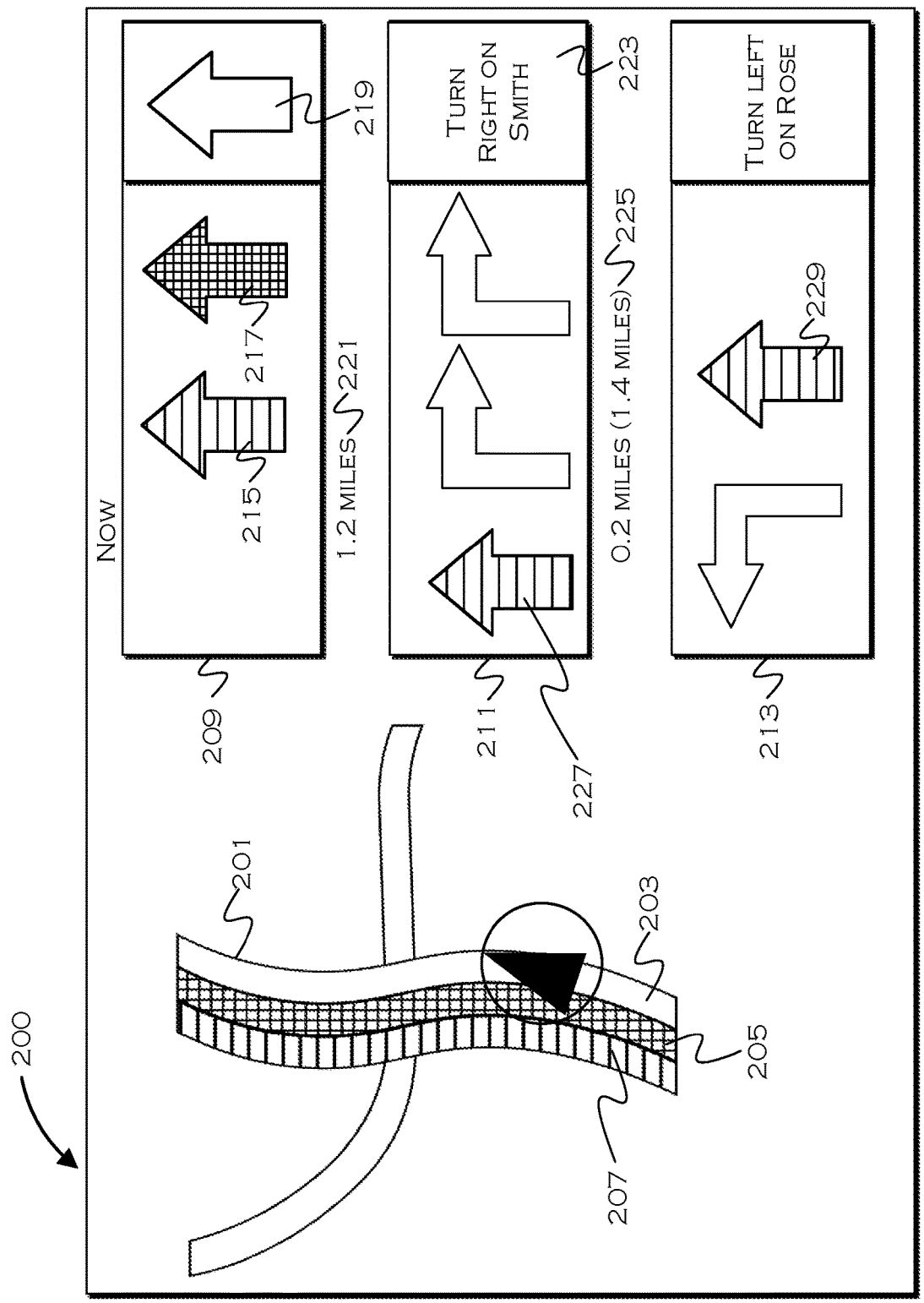
FIG. 2 shows an illustrative example of a navigation display, including enhanced lane information.

FIG. 2 shows an illustrative example of a navigation display, including enhanced lane information. In this example, the illustrative display 200 includes both a map portion and a directions portion. The map portion includes a section of a current route 201, which, in this example, includes color coded lanes, where the color coding dictates the appropriateness of a given lane for travel, based on a current intended set of directions. One lane 207 that is not a good lane for travel may be coded in red, for example. This could be because the lane terminates or because being in that lane may not leave sufficient time for a next-maneuver. Based on safety constraints defined by an original equipment manufacturer and or a highway safety board, a navigation process may, for example, determine that switching a lane safely requires a minimum of a certain amount of time. This time period could be altered based on traffic flow, but even when traffic is not considered, a driver may be given, for example, 15 seconds to safely change lanes without acting too aggressively. This means that, at 60 miles per hour, a lane shift has a tolerance of 0.25 miles (the distance a vehicle will travel in 15 seconds), whereas at 30 miles per hour, a lane shift covers 0.125 miles. So, if a vehicle is traveling on a two lane road at sixty miles per hour, any distance within 0.25 miles of the expected turn may be coded as "dangerous" or "improper." Similarly, if the same vehicle was traveling at 30 miles per hour, the navigation process may only code 0.125 miles of road before the lane shift as "improper." This allows a driver to visually see if a vehicle is still traveling in a lane that may require too much time to safely shift lanes before executing the next maneuver.

In a similar example, on a four-lane road, if a driver has to make a right turn or right-exit, the process may consider the last (last before the turn) 0.75 miles of the leftmost lane as improper, the last 0.5 miles of the next lane as improper, and the last 0.25 miles of the lane adjacent to the proper turn lane as improper. The 15 second buffer is merely provided for illustrative purposes, to show that the distance can change with speed and that the distances can stack up when a driver has to cross multiple lanes. In the preceding example, the last 0.75 miles of the leftmost lane are considered improper because the vehicle must make three 0.25 mile safe merges before reaching the proper lane.

Proper lanes on a map that accommodate a turn may be designated as green 205 (or any suitable color, and medium-risk lanes (from the perspective of executing a next-direction) be designated as yellow 203. In a similar manner, if a lane merges, the process may code the lane as red if the merge is within a safe lane-change distance and yellow if the merge is within a different threshold associated with lower risk.

So, in the example shown, the road may allow right turns from two lanes 203 and 205 A correspondingly coded set of arrows 209 may show the current navigation-state, with a red-arrow 215 indicating that the driver should not be traveling the leftmost of three lanes, a green arrow 217 indicating a preferred lane of travel, and a yellow arrow 219 indicating a medium-risk lane of travel. The box around arrow 219 show the current lane of travel, so the driver can quickly visually determine if the vehicle is in the best possible lane.

Even though either one of lanes 205 and 203 could be used to make the right turn/exit, the process may have a reason for coding one lane green and one lane yellow. In this example, the display shows the next two upcoming navigation maneuvers following the current maneuver. In 1.2 miles 221, the driver will have to turn right/exit onto Smith 223, and this can be done using either of the two rightmost lanes. The maneuver box 211 shows that lane 227 (corresponding to lane 207) cannot be used for this maneuver, but either of the other two lanes can.

As can be seen from the third upcoming maneuver 213, however, once the driver turns right onto Smith, the driver only has 0.2 miles 225 to make a left turn. Accordingly, if the driver elects to make the turn onto Smith in the rightmost lane, the driver will quickly have to change lanes again to make the left turn. The 0.2 mile designator may also show a total distance before the maneuver (1.4 miles), so the driver knows how far ahead a given direction will occur. Since the "best" lane for taking the right turn is the middle lane 205 in the map display, because this will leave the driver in the best lane for taking the near-immediate left turn onto Rose shown in 213, the process may code the middle lane 205 as green (as well as the corresponding arrow) and the right-most lane 203 yellow (as well as the corresponding arrow) because while the right from this lane onto Smith will allow the driver to get to Rose via a left turn, the maneuver is not the recommended one.

Once the driver is on Smith, the driver cannot or should not be in the right-most lane (the red arrow 229) because the driver cannot turn from that lane. At that time, the map display will be displaying Smith and possibly Rose, with the corresponding lanes color coded. But, since the process knows that the driver will be making these turns eventually, the process can code the arrows in advance of the maneuver so that the driver can plan a series of turns with better knowledge. This machine-assisted knowledge essentially acts as a proxy for the local-knowledge a local driver will develop over time, and helps avoid placing an out-of-town driver in a dangerous or uncomfortable situation. Audible alerts can also be included to either recommend a lane shift or alert the driver of an upcoming "pain point," and the alerts can be as detailed as "<right> turn onto<Smith> ahead, turning from the <current> lane is <possible> <but not recommended> because of <an upcoming left turn> onto<Rose>." The portions in < > represent variable segments of the sentence, so if the driver was, for example, in the correct lane the output might be "<right> turn onto<Smith> ahead, turning from the <current> lane is <recommended> because of <an upcoming left turn> onto<Rose>." Or, if the driver was in the wrong lane, alternative output might be "<right> turn onto<Smith> ahead, turning from the <left-most turn> lane is <recommended> because of <an upcoming left turn> onto<Rose>." This level of detail might be more useful than a common current output which might be something along the lines of "right turn onto Smith ahead, then, in 0.2 miles a left turn onto Rose."

While the "current output" example includes a level of detail that would allow a driver to know about the quick left in advance, the driver does not necessarily realize that making the right turn in one lane as opposed to another is a far better method for making the maneuver. And while the driver might realize this fact under optimal conditions, a driver in heavy traffic or unfamiliar territory might not have the mental reserves sufficient to realize which lane to make the right turn in, until it is too late, because most of the driver's attention is focused on simply driving safely.

Arrows can also be shaped in accordance with a next-possible upcoming maneuver on a lane, so that a driver knows if a lane turns, turns and goes straight, etc. If, for example, a road branches to an exit and goes straight, and the driver is supposed to go straight, the arrow may be multi-colored, such that the branch portion of the arrow is red and the straight portion of the arrow is green. In other examples, the arrows may only be shaped in accordance with the expected maneuver (e.g., left turn only if the left turn is expected, thus the arrows provide visual instruction) or the arrows may only be shaped in accordance with possible options at a point where the maneuver is expected to be made.

It is worth noting that maneuvers can include instructions such as "travel straight" or "merge right" and are not simply limited to turns. Especially if a number of branching options are possible, for example, it may be useful to remind a driver to "travel straight."

Figure 3:
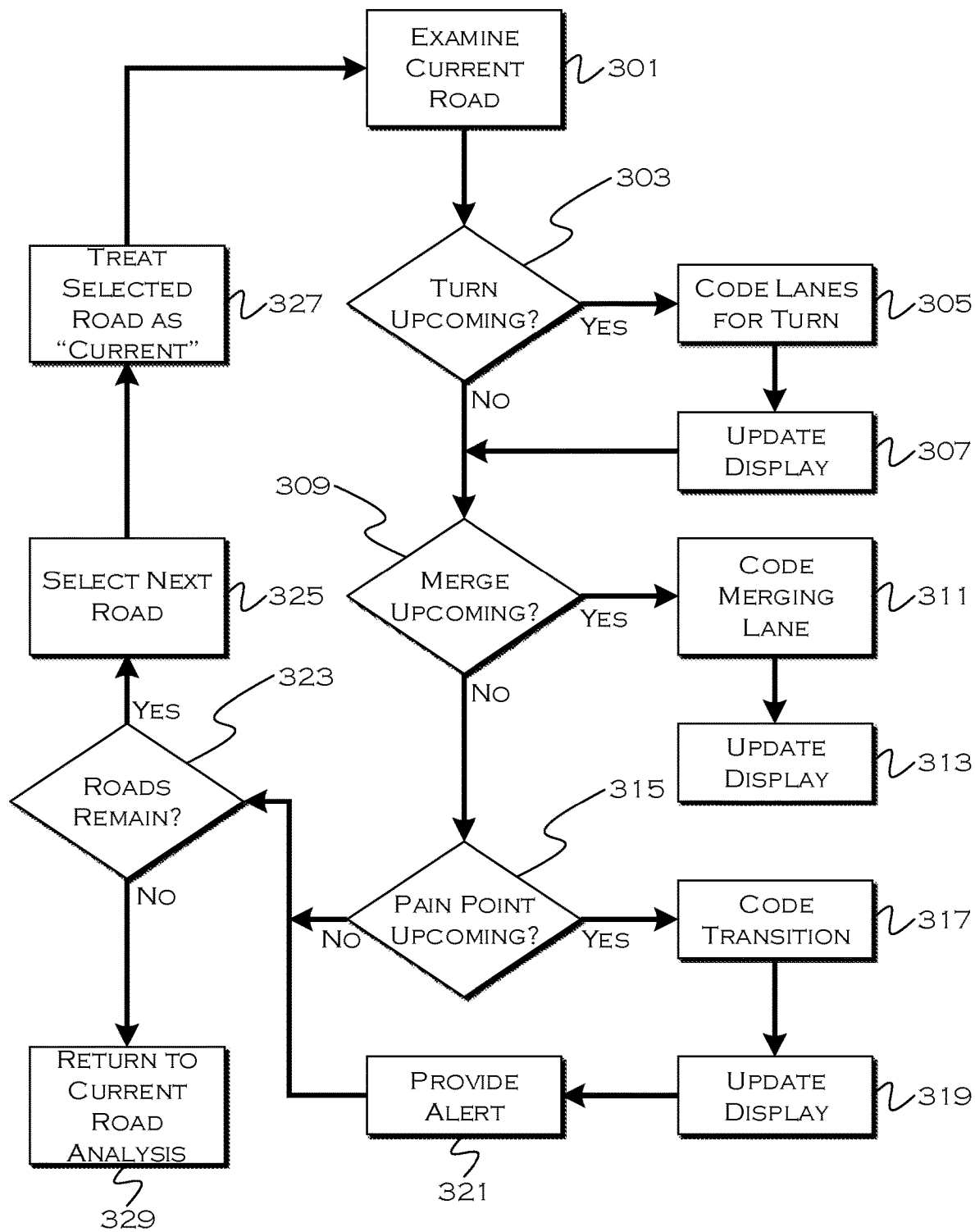
FIG. 3 shows an illustrative process for providing directions with enhanced lane information.

FIG. 3 shows an illustrative process for providing directions with enhanced lane information. In this example, the process examines 301 a road on which a vehicle is currently traveling, to determine 303 if a turn is upcoming or not. If there is an upcoming turn 303, the process will code 305 one or more lanes for making the turn and then may update 307 a displayed map and/or maneuver boxes. Coding the lanes can include, for example, coding lanes green that can facilitate a turn, coding lanes red that are too far from the turn (based on a present location) to be used for the turn, and coding lanes yellow that are not the recommended lanes (or which might require a merge before the turn can even be made, but in which a merge can still safely occur).

In a similar manner, the process may determine 309 whether or not a merge is upcoming for a displayed lane and may code 311 the merging lane in accordance with parameters for safely making the merge occur, were the vehicle to be traveling in the merging lane. Again, the display can be updated with the coding following the coding determination. This process can analyze lanes for upcoming as well as presently display maneuvers, so that if a next-maneuver involves turning right onto a three lane road, but the right-most lane immediately merges following the turn, the process may code the arrow corresponding to that lane (in the third maneuver box) as red, indicating that the driver should not turn right into that lane if possible, because the lane immediately merges. A corresponding right-turn arrow in the second maneuver box (the box indicating the actual turn) may also be coded red or yellow, as the lane may not be optimal for making the turn. On the other hand, if only a single lane can be used to make the right turn, the process may code the turn arrow green and the subsequent (in the next maneuver box) corresponding travel arrow red, so the driver can visually see that following the only possible lane for making a right, that lane almost immediately merges into another lane. Again, this is the sort of maneuver that could also be audibly conveyed, e.g., "upcoming right turn onto Wilson in 0.5 miles, followed by an immediate merge-left" or "followed by a merge-left in the first 0.2 miles after the turn."

Finally, in this example, the process determines if a "pain point" is upcoming. "Upcoming" can be within a manufacturer or user defined distance, and can vary based on the particular determination (e.g., "upcoming" for a merge may include a maneuver required within a first distance, and "upcoming" for a pain point may be a maneuver required within a second distance, or a maneuver with a following maneuver within a second distance). If there is an upcoming pain point, the process will code 317 the transition with appropriate coding for the proper or best lanes of travel, such as described in the preceding examples. This can include, for example, coding ideal lanes in green and usable, but not preferred, lanes in yellow, and not-recommended lanes or "impossible" lanes in red.

The process then updates 319 the display and also provides 321 an alert to the user, or prepares an alert for provision at an appropriate (distance-wise and/or time-wise) alert prior to the pain point. This alert can be either or both of visual and/or audible.

Following the appropriate coding, the process can determine 323 if any roads remain (or remain within an upcoming series of directions) and select 325 a next road for analysis.

Treating 327 the next road as a "current one," the process can repeat the coding. In some examples, the process could perform the calculations for the entire route and pre-determine all coding change points, in other examples, such as those where traffic is considered, the process may wait until the vehicle is within a certain time or distance, in order to correctly code the roads.

With regards to traffic, if the process considered traffic, for example, this can change the coding based on how much more difficult the traffic will make merging, lane changing, turning, etc. For example, in an open road situation, a user might be given 0.25 miles to merge, but in heavy traffic the user might require 0.75 miles to merge, because the availability of a merge space may be uncertain. Thus, the process can accommodate real time and/or projected traffic. The same sorts of considerations can be applied to pain points, such that the parameters associated with coding and even whether or not something is a pain point in the first place may change or vary based on a detected or determined traffic level. Also, if traffic is a consideration, the process can continually analyze 329 the route as it is being traveled, in order to accommodate coding changes due to traffic. While a merge may be considered a pain point, in some embodiments it may be a pain point under certain circumstances, such as having a very short distance to merge, or merging in the presence of traffic.

Figure 4:
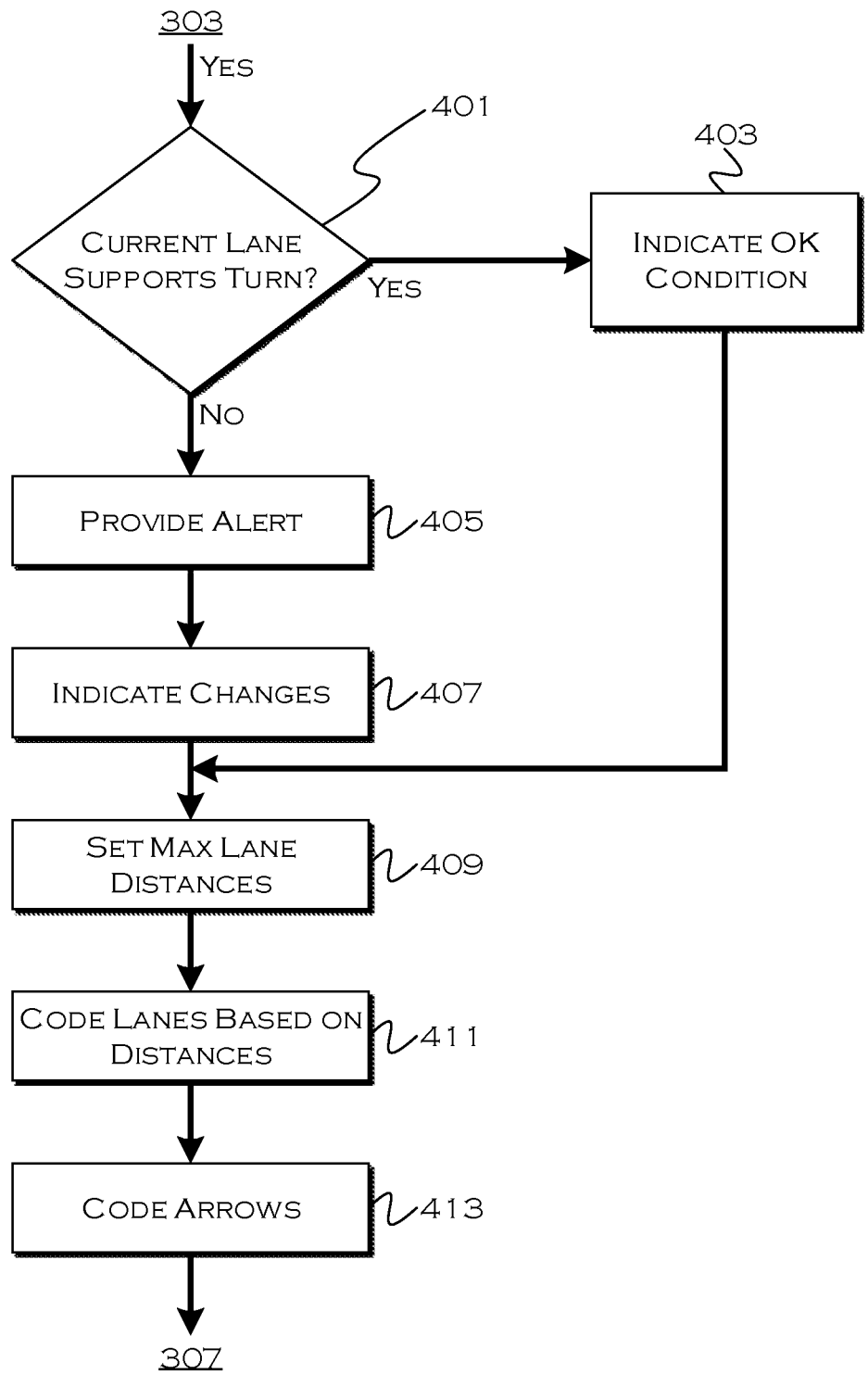
FIG. 4 shows an illustrative process for turn evaluation.

FIG. 4 shows an illustrative process 305 for turn evaluation. This is an illustration of how a process might consider certain variables associated with each possible lane for making (or not-making) a turn. This process could be run as a vehicle approaches within a certain time or distance of a turn (as shown), or could be run in advance of the entire route, and where the process says "current lane" that would equate to a vehicle being at a certain position in each of a set of considered lanes.

In this example, the process determines 401 if the current lane in which the vehicle is traveling will support a needed turn. That is, if the vehicle maintains the lane, can the vehicle turn where needed? If the answer is "yes," the process can indicate 403 to a driver that a current lane is an acceptable lane. While the indication is not necessary, some drivers may prefer to have the vehicle tell them when they are doing the correct maneuver, as well as alerting them to when a maneuver needs to be performed. If the vehicle needs to change lanes to execute the turn (or if the vehicle needs to change lanes to an optimal lane, based on a pain point, for example), the process may provide/prepare 405 an alert and indicate (visually and/or verbally) what lane changes need to be made.

If the process is evaluating roads in advance of a vehicle being at those roads, the process could prepare different saved scenarios depending on where a vehicle is located at a certain time or coordinate set (e.g., 1 minute or 1 mile from an exit) and use the appropriate pre-determined alert or notification.

Also, in this example, based on, for example, speed of travel or expected speed of travel, the process can set 409 maximum travel distances for lanes, such as the most distance a vehicle is advised to travel prior to needing to leave a lane. This corresponds, for example, to the 0.25 mile example above, and if the process considers traffic, the process can vary these distances to accommodate traffic. The process then codes 411 lanes based on the maximum distances (e.g, all four lanes in one scenario may be green until a vehicle arrives at 1.5 miles before a maneuver, at which point certain lanes begin to change color coding). In a similar manner, the process may code 413 current or saved arrow coding so that the necessary changes are reflected at the appropriate times/distances. That is, the process may code an arrow green for the next 0.5 miles (from a current location) and red for the next 0.2 miles after that, such that when the vehicle reaches 0.5 miles from the current location the red color change is already processed and saved for easy and fast retrieval.

Figure 5:
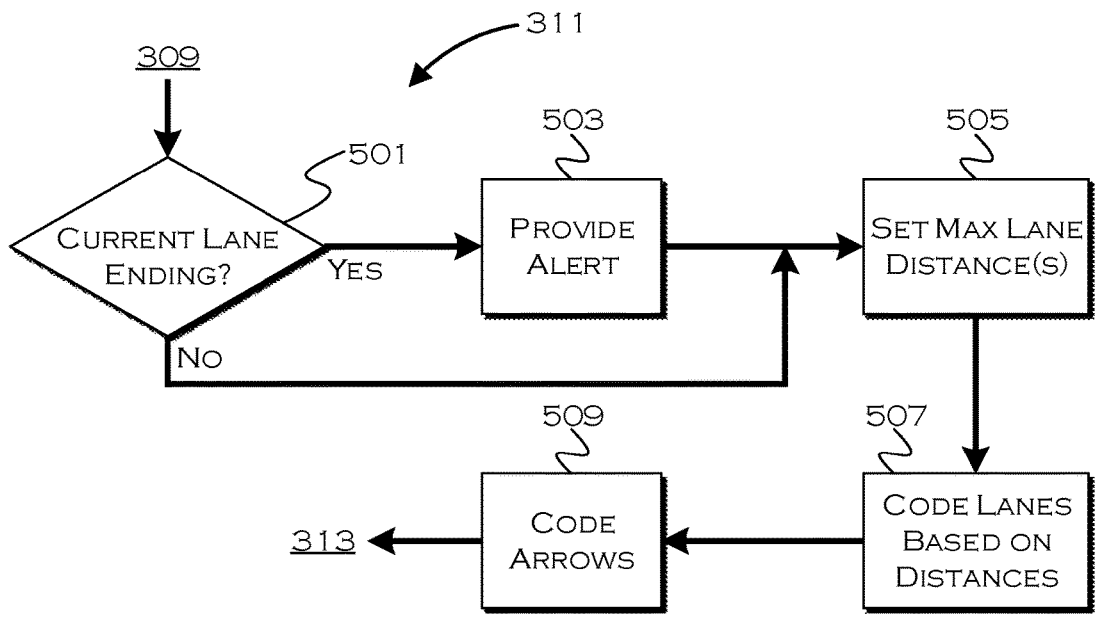
FIG. 5 shows an illustrative process for merge evaluation.

FIG. 5 shows an illustrative process for merge evaluation. In this example, the process determines 501 if a current lane (or a different lane on a current path) is ending. If the lane, especially if the vehicle is traveling in that lane, is ending, the process may provide 503 a visual or audible alert. In all of these procedures, it is understood that these evaluations could be done long in advance of the vehicle actually arriving, in order to evaluate and save predetermined points where certain changes or alerts might apply.

As with the turn consideration, the process sets 505 maximum lane distances (distances where attempting to merge is no longer advised or less-than-optimally recommended, for example) and codes 507 the lanes based on these distances. Then the process codes 509 any arrows as well.

Figure 6:
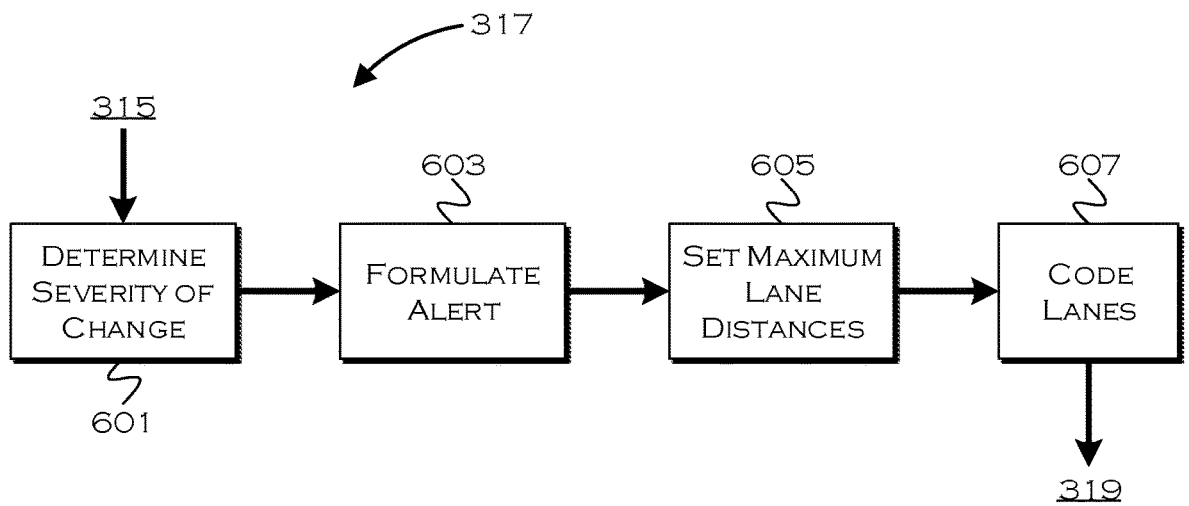
FIG. 6 shows an illustrative process for difficult scenario, "pain point," evaluation.

FIG. 6 shows an illustrative process for difficult scenario, "pain point," evaluation. There is a slight variance in this determination example, in that the process determines 601 a "severity" of a necessary change in order to formulate 603 an alert. For example, if a turn had another turn 0.5 miles away, but two lanes could accommodate the second turn, the distance and options might make the pain point minimal. On the other hand, if a user had to cut across three lanes of highway within 0.2 miles and then immediately exit, turn right and then 0.3 miles later turn left, the fact that five maneuvers (3 merges, a right and a left) were required within 0.5 miles might make the pain point a "high pain" or "high risk" point.

The process formulates 603 an alert, which can change form and severity based on the corresponding pain point data. That is, a low pain point might only have a low-urgency visual alert, for notification purposes, while a high pain point might include bright visual and loud audible notification, including complete suppression of any in-vehicle sound, etc., to ensure that the driver was well aware of the upcoming difficulty.

Again, the process may set 605 the maximum lane distances, but may also adjust the coding if certain lanes are "necessary" lanes, even if they do not meet typically prescribed minimums. For example, if a vehicle needs to merge across three lanes of 60 mph traffic in 0.3 miles, 0.1 mile of each lane may be coded green, despite this possibly being under a normal tolerance for coding the lane green. If the difficulty of the maneuver is past a certain point, which could be generally or driver-specifically determined (e.g., infirm or young drivers may be in a different classification), the process may even offer a route around or automatically route-around a pain point. The process then codes the 607 lanes (and arrows) in accordance with the maximums determined for that particular pain point. Even if the "ok" (e.g., green) coding is below typical minimums, at least the driver is advised of the most likely usable path to accomplish the expected maneuver.

Figure 7:
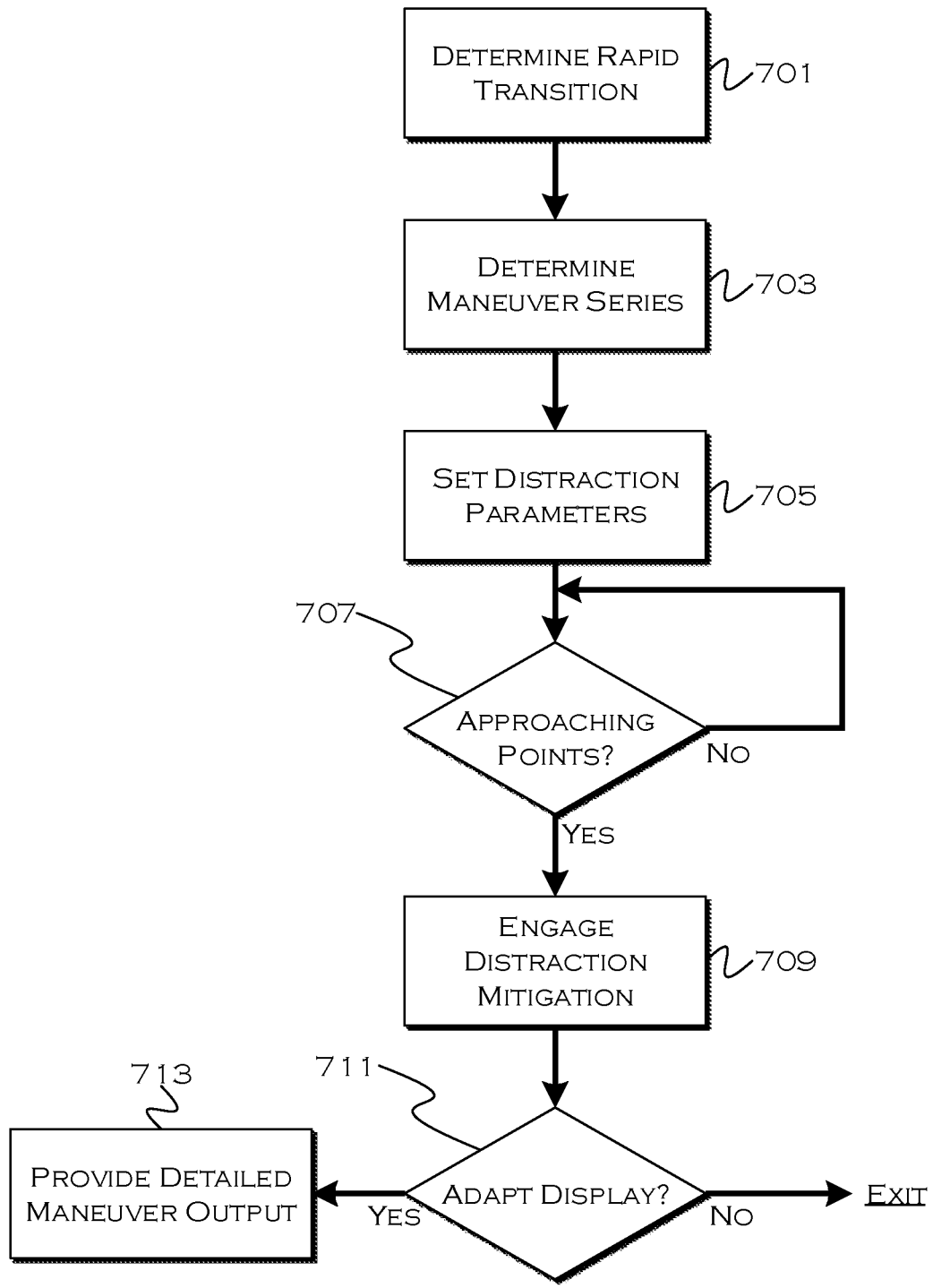
FIG. 7 shows an illustrative process for temporary enhanced navigation.

FIG. 7 shows an illustrative process for temporary enhanced navigation. In this example, the process may engage enhanced navigation at certain pain points, for example, to assist a driver in navigating difficult situations.

In this example, the process may determine that a rapid transition between several maneuver points, or a rapid transition between lanes and/or turns is upcoming. Because this sort of maneuvering may require enhanced driver attention, especially if the driver is in an unfamiliar area, the process may alter other vehicle settings temporarily while the transition occurs, in order to keep driver attention focused on the necessary navigation. For example, the process may determine 703 the complexity and requisite maneuvers in order to complete a pain point navigation, and the process may set 705 distraction parameters accordingly. This could include, for example, turning media down or off entirely, engaging calling re-direction services such as do not disturb, and any other features that may serve to reduce driver distraction. The level of changes may depend on the complexity of the maneuver, current exterior conditions (e.g., weather, traffic, road conditions, etc.) and a level of familiarity of the driver with the area (such as how many times in X days the driver had driven in the area or made the specific maneuver in question).

Once the vehicle is approaching 707 the pain point (e.g., within a threshold distance of where maneuvering will begin), the process can engage 709 distraction mitigation. The threshold distance can vary based on maneuvers required, for example, if a user needs to merge over two lanes before engaging the pain point, the process may begin distraction mitigation sooner than if the user was already traveling in the correct lane.

In addition to taking the actions prescribed by the distraction parameters to mitigate driver distraction during the maneuver, the process may also adapt the display (based on driver preference, for example) to show an enhanced set of detailed maneuver output. If display adaptation is desired 711, the process could show enlarged turning detail, an overhead map of all turns, a written list of maneuvers or anything else that is deemed appropriate to assist the driver in navigating a difficult set of maneuvers. The process may provide 713 detailed maneuver output to the driver, which can also include audible instructions as necessary.

Through the illustrative embodiments, a driver can obtain enhanced navigation assistance for unfamiliar and difficult driving scenarios. The driver can also adapt to changes in road conditions, traffic states and prepare for upcoming changes, in a manner that avoids the driver having to make last-second decisions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine that a first vehicle maneuver, along a present route, is instructed within a predefined distance of a present location;
determine which lanes of the present route, between the present location and a maneuver location where the first vehicle maneuver is to be completed, can be used to complete the first maneuver without intervening lane changes;
determine which lanes of the present route, between the present location and the maneuver location, can be used to reach a lane from which the first maneuver can be completed by executing one or more intervening lane changes within a distance defined as a minimum distance for executing the intervening lane changes;
provide a display including a visual route image with lanes color coded differently based on whether they can be used to complete the first maneuver without intervening lane changes, can be used to reach a lane from which the first maneuver can be completed by executing one or more intervening lane changes within the distance predefined as a minimum distance for executing the intervening lane changes, and cannot be used to reach a lane from which the first maneuver can be completed by executing one or more intervening lane changes within the distance predefined as a minimum distance for executing the intervening lane changes;
provide visual navigation instructions in the form of arrows, an arrow corresponding to each lane of the present route leading up to the manuver location, and each arrow color coded in accordance with the color coding of the lane to which it corresponds as color coded on the route image.

2. The system of claim 1, wherein the predefined distance varies based on a type of the first vehicle maneuver.

3. The system of claim 1, wherein the predefined distance varies based on a current speed.

4. The system of claim 1, wherein the predefined distance varies based on a road speed limit.

5. The system of claim 1, wherein the predefined distance varies based on traffic.

6. The system of claim 1, wherein the predefined distance varies based on environmental conditions.

* * * * *